Oct. 14, 1969 E. DILLINGHAM ET AL 3,472,373

TICKET HANDLING APPARATUS

Filed Sept. 7, 1966 3 Sheets-Sheet 1

INVENTORS:
EDWARD DILLINGHAM
WILLIAM W. CALDWELL
WILLIAM W. DeVORE

By Jerome B. Rockwood
AGENT

Oct. 14, 1969 E. DILLINGHAM ET AL 3,472,373

TICKET HANDLING APPARATUS

Filed Sept. 7, 1966 3 Sheets-Sheet 2

INVENTORS:
EDWARD DILLINGHAM
WILLIAM W. CALDWELL
WILLIAM W. DeVORE
By Jerome P. Kadwood
AGENT Oct. 14, 1969 E. DILLINGHAM ET AL 3,472,373

TICKET HANDLING APPARATUS

Filed Sept. 7, 1966 3 Sheets-Sheet 3

INVENTORS:
EDWARD DILLINGHAM
WILLIAM W. CALDWELL
WILLIAM W. DeVORE
By [signature]
AGENT United States Patent Office 3,472,373

Patented Oct. 14, 1969

3,472,373

TICKET HANDLING APPARATUS

Edward Dillingham, Pacific Palisades, and William W Caldwell and William W. De Vore, Palos Verdes Estates, Calif., assignors to Advance Data Systems Corporation, Beverly Hills, Calif., a corporation of New York Filed Sept. 7, 1966, Ser. No. 577,714
Int. Cl. B07c *3/14, 5/34;* B65h *9/16*
U.S. Cl. 209—73 8 Claims

ABSTRACT OF THE DISCLOSURE

Ticket handling apparatus for use with magnetically encoded tickets. A ticket inserted in the inlet slot interrupts a light beam to actuate the apparatus. Drive rollers cooperating with idlers propel the ticket with one edge against a skewed guide to insure proper alignment with a plurality of magnetic heads. Some of the magnetic heads read the magnetic indicia on the ticket, while other heads may record different indicia. In accordance with the indicia, the ticket may be presented to the owner at an exit slot, or a deflector may be actuated to deflect the ticket into a capture bin.

The present invention relates to ticket handling devices and more particularly to a ticket handling apparatus which is adapated for installation as part of a turnstile or adjacent thereto.

The ticket handling apparatus of the present invention accepts a ticket indicating a fare or an admission from the passenger prior to, or simultaneously with his entry into the turnstile apparatus. Indicia on the ticket is read in the ticket handling apparatus during the passage of the ticket therethrough. The ticket is returned to the passenger through an exit slot on the other side of the turnstile, or, alternatively, depending upon the indicia thereon, the ticket is retained within the apparatus. A ticket inserted into the entry throat interrupts a light beam, starting a motor and initating operation of the apparatus. Drive rollers cooperating with idler rollers propel the ticket against a guide to insure proper alignment with magnetic heads for reading the indicia and, as in the hereinbelow disclosed embodiment, writing additional indicia. A capture mechanism may be operated either to return the ticket to the passenger through the exit slot, or intercept the ticket within the apparatus and store it in a bin.

The guide employed to align the ticket with respect to the reading and writing apparatus is skewed with respect to the line of the drive rollers. The skewed guide insures that the ticket edge will always be in contact with the guide and therefore in proper relation to the indicia reading and recording apparatus. Since the ticket handling apparatus of the present invention operates very rapidly, passing the ticket from the ticket entrance throat to the exit slot within a small fraction of a second, a passenger need not wait for the ticket after passing through the turnstile. If the ticket is to be returned to the passenger, it will be positioned in the ticket exit slot prior to the time the passenger has been able to get through the turnstile. He need only keep his hand at substantially the same height for inserting the ticket and recovering it as he leaves the turnstile.

It is, therefore, an object of this invention to provide apparatus for accepting a ticket having fare or admission indicia encoded thereupon at a passenger control point, reading the indicia, and either capturing the ticket or returning it to the passenger.

Another object of the invention is to provide a unidirectional ticket handling apparatus having a ticket reception slot and a ticket return slot.

Another object of this invention is to provide unidirectional ticket handling apparatus adapted for mounting in combination with, or adjacent to a turnstile or other passage control device.

Another object of this invention is to provide a unidirectional ticket handling apparatus adapted to receive a ticket from a passenger entering a turnstile, read indicia encoded thereupon, and either return the ticket to the passenger as he leaves the turnstile or capture and retain the ticket in accordance with the encoded indicia.

Another object of this invention is to provide a ticket handling device which is simple, reliable, compact, and inexpensive to manufacture.

These and other objects and advantages of the present invention will become more apparent from the following specification and accompanying drawings, wherein.

Figure 1:
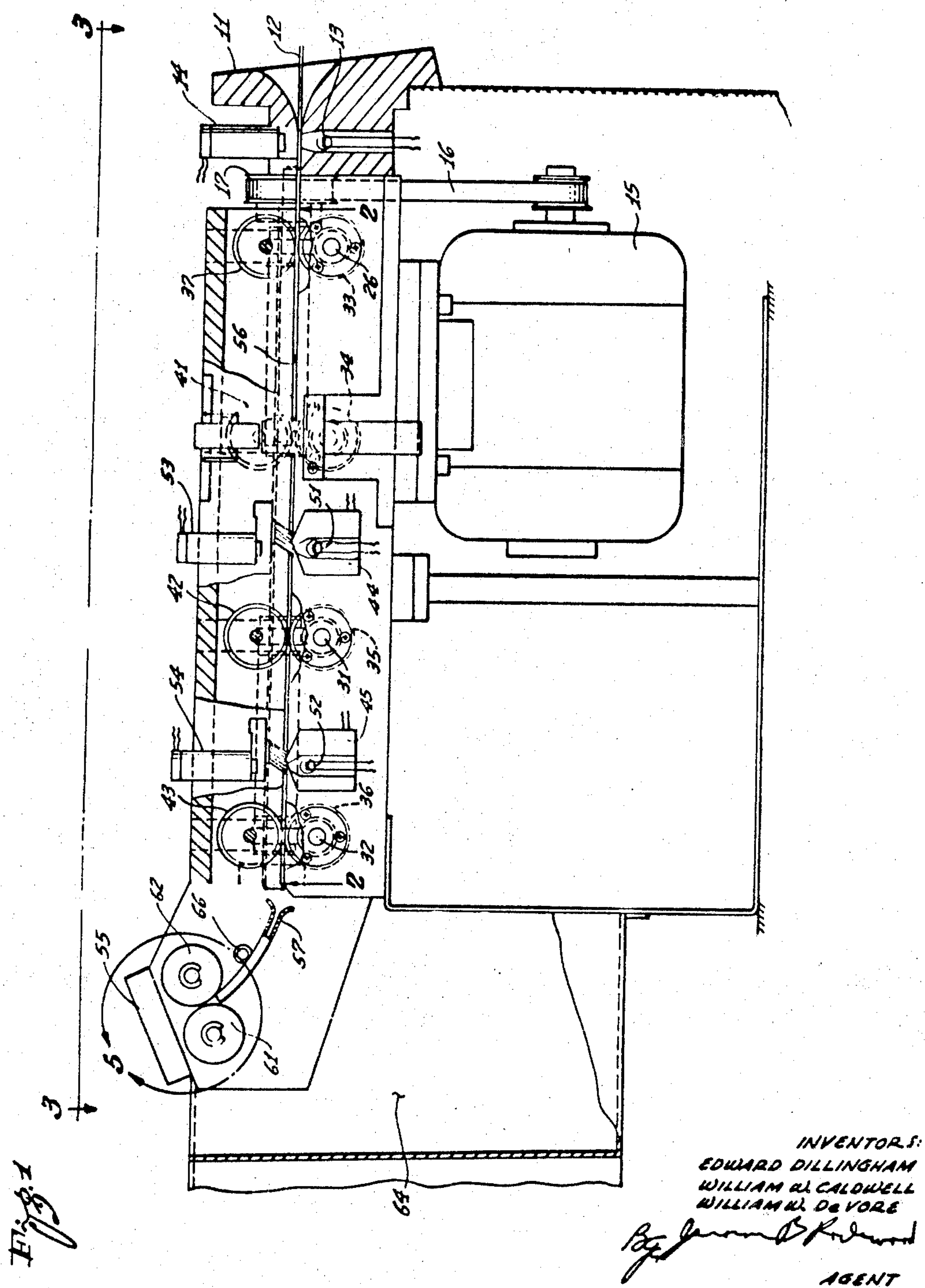
FIGURE 1 is a side view, partially cut away, of the ticket handler of the present invention.
Figure 3:
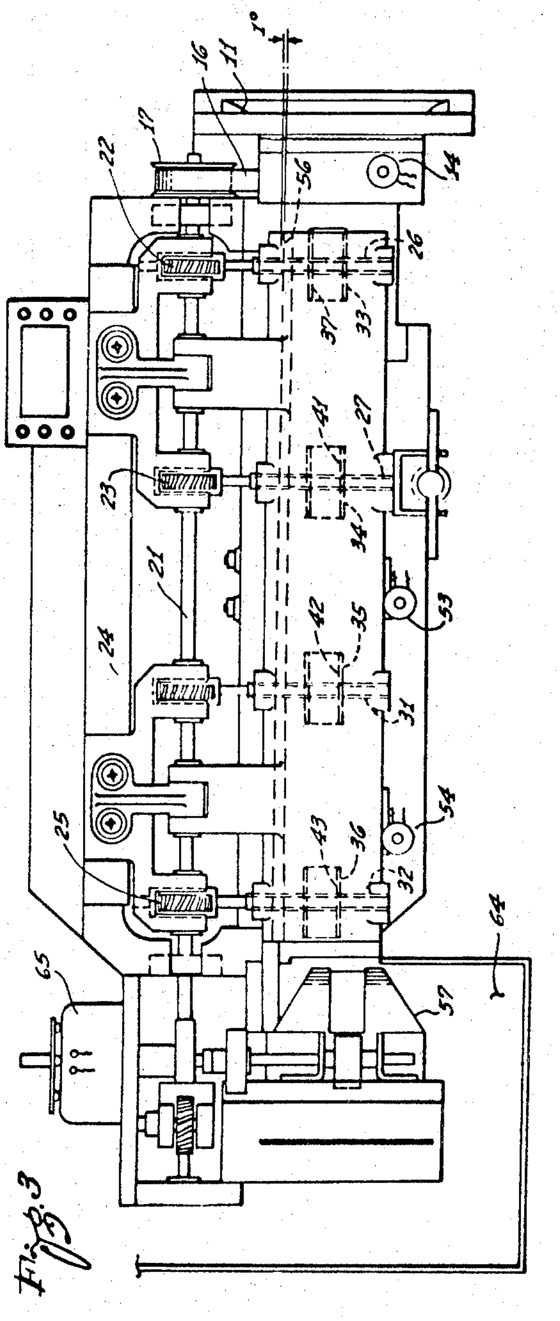
FIGURE 3 illustrates the ticket drive assembly.
Figure 2:
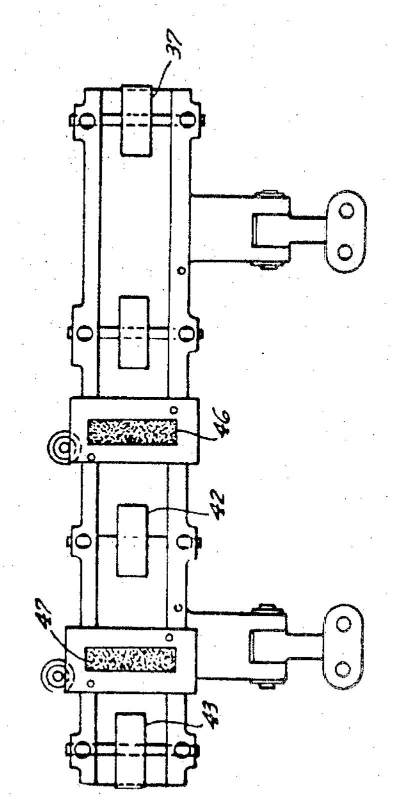
FIGURE 2 is an illustration of the idler roller frame assembly.

Referring now to the drawings and particularly to FIG. 1 thereof, ticket entrance throat 11 receives ticket 12. Lamp 13 normally illuminates a photo-sensitive cell 14. Insertion of the ticket interrupts the illumination and starts drive-motor 15. The shaft of drive-motor 15 rotates a belt 16 which rotates a pulley 17. Pulley 17 is affixed to drive-shaft 21, bearing four bevel gears 22, 23, 24 and 25. Mating gears, not shown, are driven by gears 22, 23, 24 and 25 to rotate shafts 26, 27, 31 and 32 in synchronism. Fastened to shafts 26, 27, 31 and 32 are drive rollers 33, 34, 35 and 36 respectively. Idler rollers 37, 41, 42 and 43 are yieldingly urged against drive rollers 33, 34, 35 and 36 respectively and rotated thereby. The peripheries of all of the rollers are covered with a high friction material, such as rubber, to grasp the ticket and propel it through the apparatus. Suitable brush-like pads 46 and 47, mounted overlying magnetic heads 44 and 45 respectively, insure intimate contact of the magnetic heads 44 and 45 with the magnetic oxide coating on the ticket.

The ticket is coated on one face with a suitable magnetic oxide, magnetically encoded with fare or admission indicia. The magnetically coded indicia on the card are read by magnetic reading head 44. Reading head 44 is connected to suitable control apparatus to determine whether the proper fare or admission charge is encoded upon the card. The control apparatus may also indicate the remaining fare value or admission value on the card, which may then be magnetically recorded upon the ticket by writing head 45. As the leading edge of the ticket passes over the magnetic heads 44 and 45, a beam of light from lamps 51 and 52 is broken resulting in signal output from photo-responsive cells 53 and 54 respectively, signaling the position of the ticket and initiating the reading and writing operation. Reading and writing heads 44 and 45 and photo-responsive cells 14, 53 and 54 are connected to the control apparatus disclosed in co-pending application, Ser. No. 460,771, now abandoned, for Data Processing Systems and Apparatus Therefor, filed June 2, 1965, and having a common assignee with that of the present application. The circuit disclosed in the above-identified co-pending application accepts the signals provided by reading head 44 and the photo-responsive cells digitally processes the signals, controls the operation of the turnstile adjacent to the ticket reader, deducts the fare from the amount encoded on the ticket, provides a signal to writing head 45 to write the remaining fare on the ticket and generate a ticket capture signal if the amount encoded is exhausted.

Figure 4:
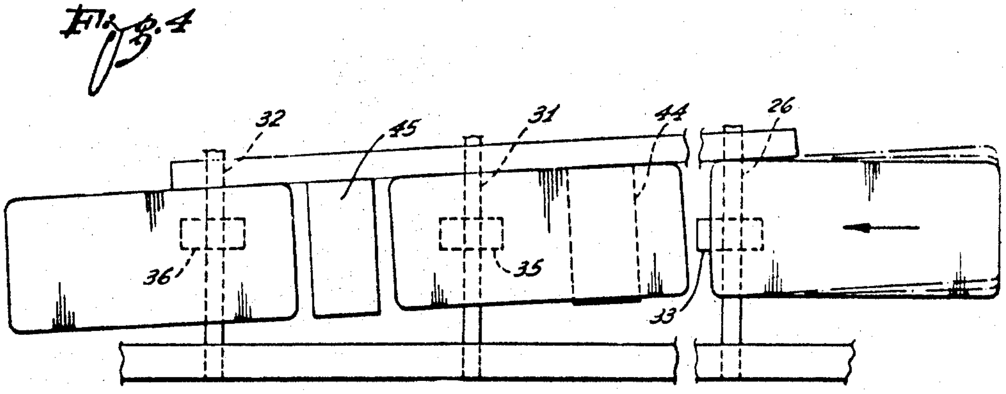
FIGURE 4 is a schematic diagram showing the angular relationship between the ticket guide and drive rollers and the cooperation thereof with a ticket.
Figure 5:
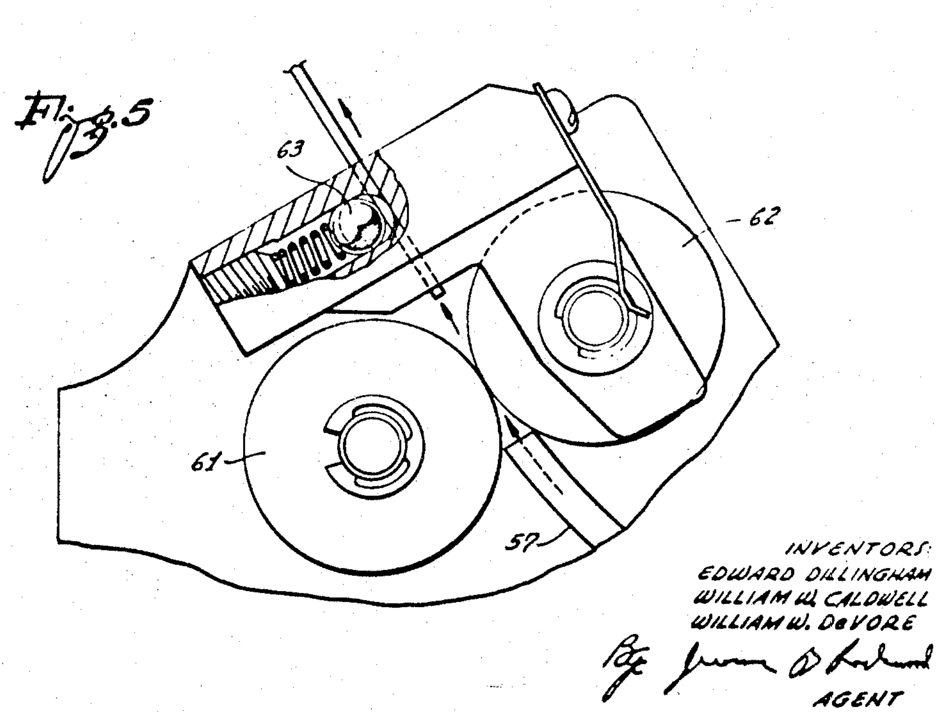
FIGURE 5 is a view, partially cut away, of the exit slot of the ticket handling device of the present invention.

As disclosed hereinabove, the drive rollers and idler rollers are aligned to move the ticket in a straight line. However, the ticket guide slot 56 has an aligning edge which is skewed with respect to the drive line of rollers. The skew may conveniently be on the order of 1%. The skewed relationship between the drive line and the guide is so adapted that the edge of the ticket is forced into contact with the guide by the angle between the guide and the ticket drive rollers, as illustrated in FIG. 4. Magnetic heads 44 and 45 are perpendicular to the guide so that the coded indicia on the ticket are always in the correct position to cooperate with magnetic heads 44 and 45.

If there are remaining fares encoded upon the ticket, it is returned to the passenger through ticket exit slot 55, where the passenger may retrieve it as he leaves the turnstile. A ticket deflector 57 accepts the ticket as it leaves guide 56 and drive roller 36 and idler roller 43, as clearly illustrated in FIG. 1. The ticket is grasped by exit drive roller 61 and exit idler roller 62 prior to the trailing edge of the ticket leaving drive roller 36 and idler roller 43. Exit drive roller 61 and exit idler roller 62 drive the ticket through the exit slot, where the leading edge of the ticket deflects a spring loaded ball 63. As the trailing edge of the ticket leaves exit rollers 61 and 62, spring loaded ball 63 functions as a brake and stops the progress of the ticket, retaining it in the exit slot ready to be retrieved by the passenger as he leaves the turnstile. It will be apparent that without the braking effect of spring loaded ball 63, drive roller 61 would propel the ticket completely out of the slot.

If the ticket is to be captured, as for example when there are no more useable fares left, the deflector assembly 57 is rotated counterclockwise, as illustrated in FIG. 1, to allow the ticket to be propelled into a capture bin 64. A signal from control apparatus of the hereinabove-identified co-pending application is applied to a rotary solenoid 65 which rotates a shaft 66 counterclockwise to remove the exit guide 57 from proximity to ticket guide 56 and the path of the ticket, allowing the ticket to be propelled into capture bin 64.

It will be understood that the invention has been described by way of example only, and is not limited to the embodiment disclosed hereinabove, but is to be limited only by the scope of the appended claims.

What we claim is:

1. Magnetic ticket handling apparatus comprising:
- a ticket inlet slot;
- a ticket outlet slot;
- linear ticket drive means between said ticket inlet slot and said ticket outlet slot, said linear ticket drive means including a plurality of spaced driving rollers linearly arranged, and a plurality of idler rollers yieldingly urged toward said driving rollers and rotated thereby;
- linear ticket guide means between said ticket inlet slot and said ticket outlet slot, said linear ticket guide means being skewed at a constant angle with respect to said linear ticket drive means;
- ticket reading means; and
- ticket position sensing means.

2. In the apparatus of claim 1, said ticket reading means including a reading head mounted parallel to the plane of ticket passage and perpendicular to said linear ticket guide means for reading indicia encoded on a ticket.

3. In the apparatus of claim 2, said ticket position sensing means including:

- a first light sensitive cell adjacent said ticket inlet slot,
- a second light sensitive cell adjacent said ticket reading head;
- a first lamp normally illuminating said first light sensitive cell; and
- a second lamp normally illuminating said second light sensitive cell.

4. In the apparatus of claim 3, said ticket inlet slot having a receiving aperture in the plane of said linear ticket guide means:
- said ticket outlet slot having a presenting aperture at an angle from the plane of said linear ticket guide means, and
- a curving ticket outlet guide adjacent said ticket outlet slot and said linear ticket guide means for guiding a ticket to said ticket outlet slot.

5. In the apparatus of claim 4, ticket capture means adjacent said ticket outlet slot including:
- a ticket capture bin;
- a bearing on said ticket outlet guide enabling rotation of the end adjacent said linear ticket guide from a ticket returning position in alignment with said linear ticket guide, thereby ejecting a ticket at said ticket outlet slot, to a ticket capturing position whereby said ticket drive means ejects a ticket into said ticket capture bin; and
- electrical means for rotating said ticket outlet guide from said ticket returning position to said ticket capturing position.

6. In the apparatus of claim 5:
- outlet ticket drive means adjacent said ticket outlet guide, said outlet ticket drive means including;
- an outlet ticket driving roller; and
- an outlet ticket idler roller yieldingly urged toward said outlet ticket driving roller and rotated thereby.

7. In the apparatus of claim 6 said presenting aperture having ticket retainer means including:
- an aperture perpendicular to said ticket outlet slot;
- a sphere having a diameter greater than the thickness of said slot; and
- resilient means urging said sphere into slot-obstructing position whereby a ticket driven by said outlet ticket drive means displaces said sphere upon entering said ticket outlet slot and is retained in said presenting aperture for recovery by a passenger by said sphere upon a ticket leaving said driving rollers.

8. In the apparatus of claim 7, drive means for said driving rollers including:
- a drive motor actuated by insertion of a ticket in said ticket inlet slot interrupting illumination of said first light sensitive cell;
- a drive shaft connected to said drive motor; and
- gear means connecting said driving rollers to said drive shaft.

References Cited

UNITED STATES PATENTS

| | | | |
|---|---|---|---|
| 3,248,106 | 4/1966 | Fry | 271—52 |
| 2,838,361 | 6/1958 | Findlay et al. | 271—3 X |
| 3,097,745 | 7/1963 | Leo | 209—111.8 |
| 3,175,824 | 3/1965 | Albosta | 271—52 |
| 3,207,505 | 9/1965 | Nielson et al. | 271—52 X |
| 3,282,388 | 11/1966 | Lester et al. | 194—4 |

ALLEN N. KNOWLES, Primary Examiner

U.S. Cl. X.R.

209—74, 111.8; 271—52